US008867896B2

United States Patent
Scheele et al.

(10) Patent No.: US 8,867,896 B2
(45) Date of Patent: Oct. 21, 2014

(54) VIDEO FRAME MARKING

(71) Applicants: Todd Curry Zaegel Scheele, Portland, OR (US); Matthew Demian Klepp, Portland, OR (US); Ilan Amihai Sabar, Elyachin (IL)

(72) Inventors: Todd Curry Zaegel Scheele, Portland, OR (US); Matthew Demian Klepp, Portland, OR (US); Ilan Amihai Sabar, Elyachin (IL)

(73) Assignee: Vispx, Inc., Portland, OR (US)

( * ) Notice: Subject to any disclaimer, the term of this patent is extended or adjusted under 35 U.S.C. 154(b) by 71 days.

(21) Appl. No.: 13/757,648

(22) Filed: Feb. 1, 2013

(65) Prior Publication Data

US 2013/0209059 A1 Aug. 15, 2013

Related U.S. Application Data

(60) Provisional application No. 61/633,044, filed on Feb. 3, 2012.

(51) Int. Cl.
*H04N 9/80* (2006.01)
*H04N 5/932* (2006.01)
*H04N 5/04* (2006.01)
*H04N 9/82* (2006.01)
*G11B 27/10* (2006.01)

(52) U.S. Cl.
CPC .............. *H04N 5/04* (2013.01); *H04N 9/8205* (2013.01); *G11B 27/10* (2013.01)
USPC ......................................... 386/248; 386/201

(58) Field of Classification Search
USPC ................. 386/248, 241, 278, 281, 201, 208
See application file for complete search history.

(56) References Cited

U.S. PATENT DOCUMENTS

| | | | |
|---|---|---|---|
| 6,567,985 B1* | 5/2003 | Ishii | 725/115 |
| 2004/0239763 A1* | 12/2004 | Notea et al. | 348/169 |
| 2007/0201815 A1 | 8/2007 | Griffin | |
| 2008/0037954 A1 | 2/2008 | Lee et al. | |
| 2010/0296571 A1 | 11/2010 | El-Saban et al. | |
| 2011/0235703 A1 | 9/2011 | Labrozzi et al. | |

FOREIGN PATENT DOCUMENTS

WO    WO2010026162 A1    3/2010

OTHER PUBLICATIONS

International Search Report & Written Opinion mailed May 16, 2013 for International Application No. PCT/US2013/024505, 9 pages.

* cited by examiner

*Primary Examiner* — Robert Chevalier
(74) *Attorney, Agent, or Firm* — Schwabe, Williamson & Wyatt, P.C.

(57) ABSTRACT

In embodiments, apparatuses, methods and storage media are described that are associated with synchronization of captured video using a frame-marking clock ("FMC"). An FMC may be configured to display images of time codes which advance at a regular rate. During capture of video by video capture devices, the FMC may be introduced into the captured video. The FMC may be configured to display time code images in a manner such that each image may be uniquely identified in the captured video. In various embodiments, the images may be displayed in different portions of a display such that two consecutive time codes are not displayed in the same portion to facilitate unique identification of each time code in the captured video. After video capture is complete, time codes may be subsequently used to establish a common time base and synchronize the instances of video.

23 Claims, 21 Drawing Sheets

| Timing (sec) | UniqueImage | ImageLocation | DurationToShowImage (sec) |
|---|---|---|---|
| 0 | 100 | A | 1/30 |
| 1/60 | 100.5 | D | 1/30 |
| 2/60 | 101 | B | 1/30 |
| 3/60 | 101.5 | E | 1/30 |
| 4/60 | 102 | C | 1/30 |
| 5/60 | 102.5 | F | 1/30 |
| 6/60 | 103 | A | 1/30 |
| 7/60 | 103.5 | E | 1/30 |
| 8/60 | 104 | B | 1/30 |
| 9/60 | 104.5 | E | 1/30 |
| 10/60 | 105 | C | 1/30 |
| 11/60 | 105.5 | F | 1/30 |
| continue until stopped | | | |

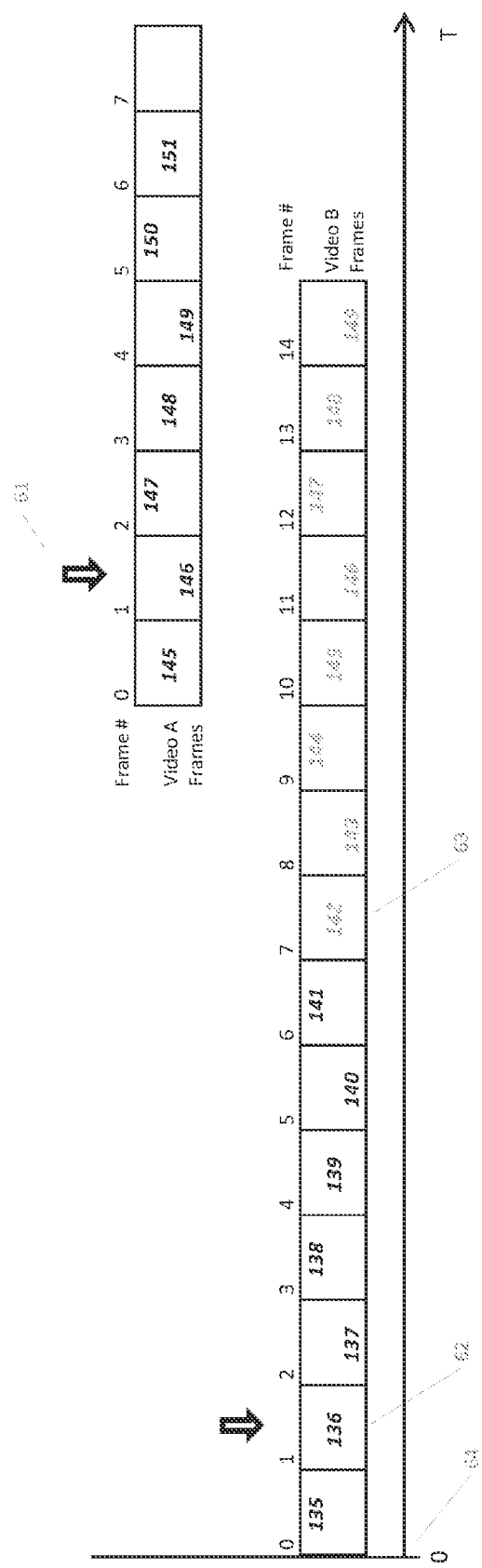

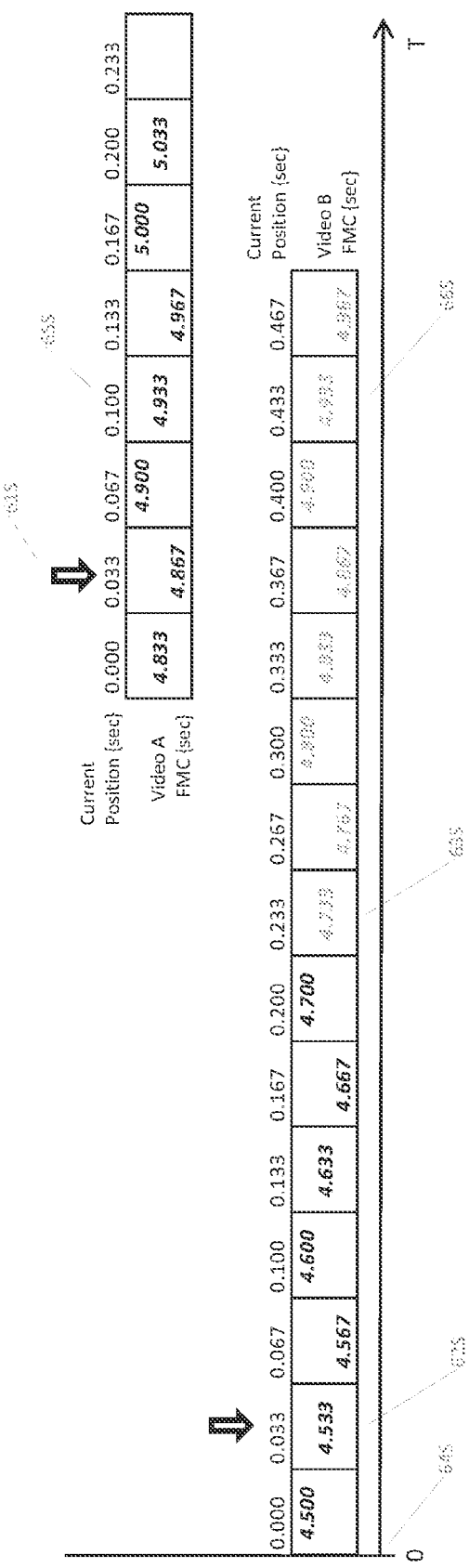

VIDEO FRAME MARKING

RELATED APPLICATION

This application claims the benefit of U.S. Provisional Application No. 61/633,044, filed Feb. 3, 2012 and entitled "Frame Marking Clock Method and System for Synchronization of Multiple Video Capture Devices," the entire disclosure of which is hereby incorporated by reference in its entirety.

TECHNICAL FIELD

The present disclosure relates to the field of data processing, in particular, to apparatuses, methods and storage media associated with video recording.

BACKGROUND

The background description provided herein is for the purpose of generally presenting the context of the disclosure. Unless otherwise indicated herein, the materials described in this section are not prior art to the claims in this application and are not admitted to be prior art by inclusion in this section. As used herein, the word "video" may be understood to include motion picture media generated from various devices and techniques, including, but not limited to: chemical film movie cameras, analog video cameras, digital video cameras, and digital video capture devices.

Multiple video capture devices are often used to record a scene, event, or activity. These multiple video capture devices may need to be synchronized in order to edit or playback the video. However, existing video synchronization ("sync") techniques present difficulties. In some techniques, multiple capture devices may be made to synchronize frame-for-frame. One example of this technique involves using special cameras that use time code signals where one camera acts as a master and other cameras act as slaves. Such techniques may operate with the goal that each camera frame starts and ends together and that each camera has the same time code. However, these techniques may require special cameras in order to allow cameras to be controlled to simultaneously start and end each frame together.

By contrast, other techniques may seek to provide sync without requiring frames from different video capture devices to start or not end together. In these techniques, devices may be started independently of each other. Frequently, these techniques rely on the filming of an audible and or visual common event, such as a clap of two hands or use of a clapboard. However, in these techniques the common event typically needs to be recorded on the audio track and/or video track of all recording devices that need to be synced. This may require that all the recording devices be available and recording at the moment of the common event and that the common event be in view and/or audible range of the recording devices. Other techniques may attempt to identify a common event from separate recordings, but these techniques may not be reliable or applicable to all situations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 15A-15C are diagrams illustrating example synchronization of frames of video marked by a frame-marking clock in accordance with various embodiments.

DETAILED DESCRIPTION

Figure 1:
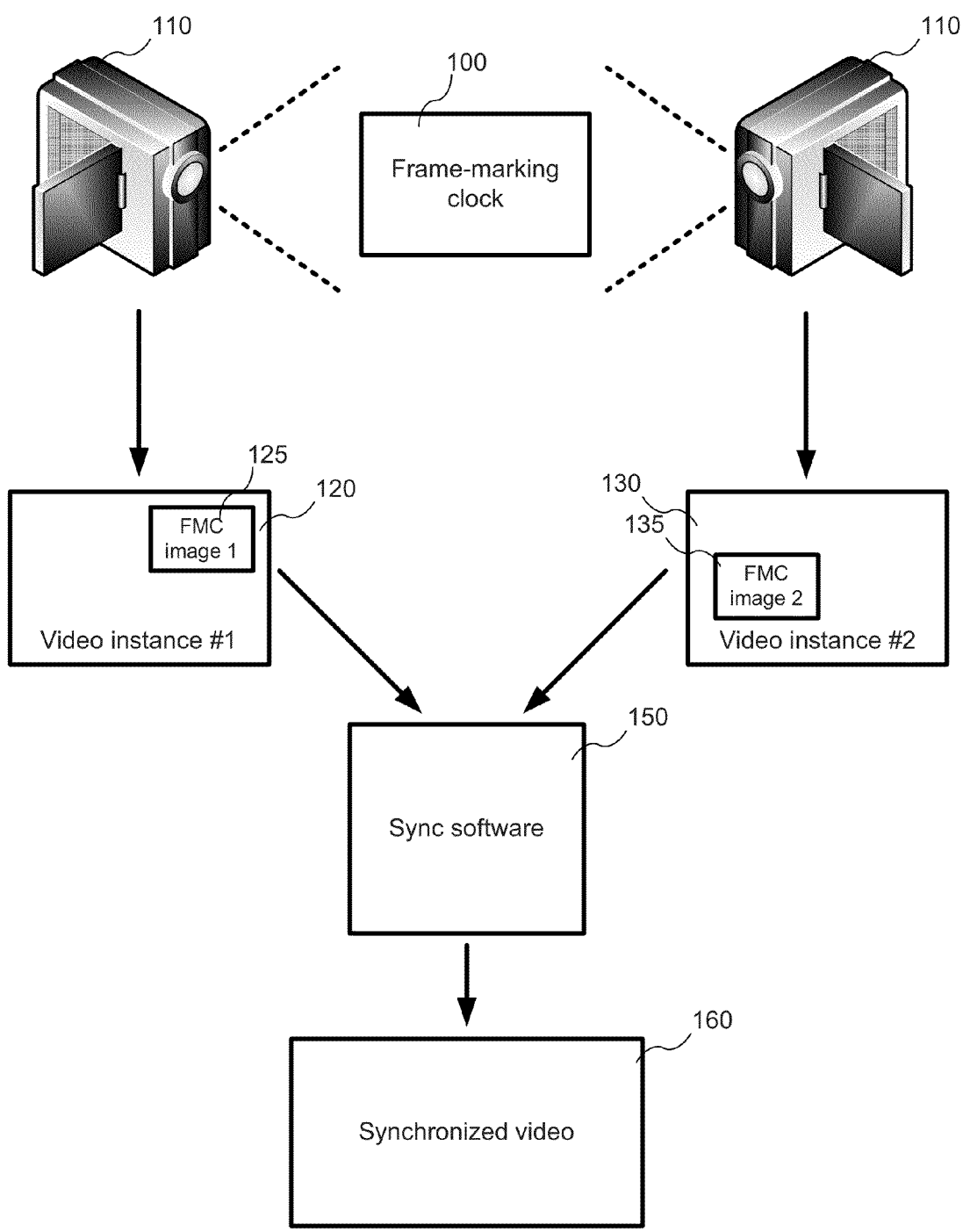
FIG. 1 is a block diagram illustrating example information flows between a frame-marking clock and various entities in accordance with various embodiments.

Apparatuses, methods and storage media associated with synchronization of captured video using a frame-marking clock ("FMC") are described herein. In various embodiments, an FMC may be configured to display time code image representing time codes which advance at a regular rate. In various embodiments, these images may represent time codes based on a common time base which may include a clock that may run independently of particular video instances. In various embodiments, this common time base may be used to facilitate subsequent video synchronization.

For example, during capture of video by video capture devices, the FMC may be introduced into the captured video. The FMC may be configured to display time code images representing time codes in a manner such that each time code may be uniquely identified in the captured video. In various embodiments, the time code images may be displayed in different portions of a display associated with the FMC such that two consecutive time code images are not displayed in the same portion. By displaying consecutive time code images in different portions, in various embodiments, the FMC may better facilitate unique identification of each time code in the captured video.

After video capture is complete, the time codes may be subsequently used to establish a common time base between multiple instances of captured video. For example, sync software may be used which is configured to identify the time codes and, using this common time base, generate time offsets for each instance of video. The FMC and sync software may thus be used to synchronize the instances of video.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, a block diagram illustrating example information flows between a frame-marking clock 100 ("FMC 100") and various entities is illustrated in accordance with various embodiments. As discussed herein, in various embodiments, the FMC 100 may be implemented in software and/or hardware, and may be implemented in various form factors. For example, in various embodiments, the FMC 100 may be implemented on a portable device to facilitate video capture. In various embodiments, the FMC may be implemented as an application executing on a computing device associated with or containing an with electronic display. In various embodiments, the computing device executing the FMC may include a portable device, such as a smartphone. In various embodiments, the FMC may be include a custom built LED.

In various embodiments, video of the FMC 100 may be captured by one or more video capture devices 110. In various embodiments, the video of the FMC 100 may be captured during capture of other video; for example a display associated with the FMC 100 may be introduced into the field of view of a video capture device 100 to provide a manner of marking frames of captured video. In various embodiments, multiple FMC 100s may be captured as well. these FMC 100s maybe synchronized, such as through networked communication between the FMC 100s, or such as through communication with a separate time source, such as a networked clock. In such embodiments, synchronization of video may still be facilitated even in situations where a capture of a single FMC would be difficult or impossible, such as when filming contemporaneous video over tong distances.

In various embodiments, video capture devices may include various devices configured to capture video in digital and/or analog form, including, but not limited to: film cameras, camcorders, digital camcorders, portable media devices with video capture capabilities, portable phones with video capture capabilities, photo cameras that are configured to capture video, and/or web cams. In various embodiments, video capture devices may also include software, such as executing on a computing device, that is configured to capture still images and/or video from a screen of a computer. In such embodiments, the FMC 100 may be executed on the computer such that when video or still images are captured from the screen of the computer, time code images from the FMC 100 are also captured. In such embodiments, the video or images captured from the computer may be synchronized with video captured by separate video capture devices, such as cameras.

In various embodiments, non-video capture devices may be used in place of or in addition to video capture devices. Thus, for example, in various embodiments, still photos that are captured by still cameras may be synchronized with video using the FMC 100. In various embodiments, still photos taken by a still camera may be associated with times based on the internal clock of the still camera. Thus, by determining an offset time of the still camera clock based on a time code displayed by the FMC 100, still photos taken by the still camera may be synchronized with video using the FMC 100.

As illustrated, in various embodiments, the video capture devices 110 may output video instances, such as the illustrated video instances 120 and 130. In various embodiments, these video instances may be output in a variety of formats and/or media. In various embodiments, the video instances may include one or more images generated by the FMC 100, such as FMC images 125 and 135. In various embodiments, the FMC images 125 and 135 may not be captured at the same moment in the video instances 120 and 130, and/or may not appear in the same area of the video instances (as illustrated).

Also, as illustrated in FIG. 1, the video instances 120 and 130 may be provided to synchronization software 150 ("sync software 150"). In various embodiments, the sync software 150 may be configured to facilitate provision of synchronized video 160 based on the video instances 120 and 130. In various embodiments, the sync software 150 may be configured to output the actual synchronized video 160. In other embodiments, the sync software 150 may be configured to output time offset values which may be used in subsequent synchronization of the video instances 120 and 130.

Figure 2A:
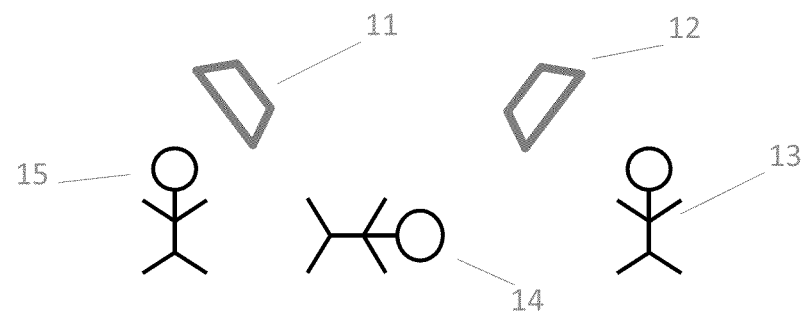
FIGS. 2A-2C illustrate example usage of a frame-marking clock in accordance with various embodiments.
Figure 2B:
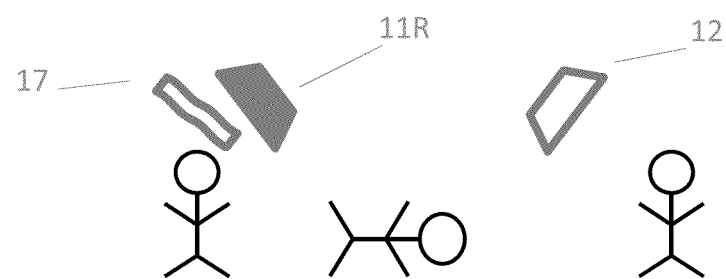
Figure 2C:
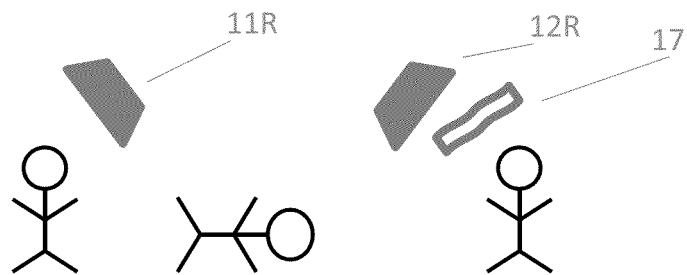

Referring now to FIGS. 2A-2C, an example usage of a frame-marking clock is illustrated in accordance with various embodiments. In the example, video of a surgery is being captured. As illustrated in FIG. 2A, a patient 14 is illustrated as lying on a table with the surgeon 15 at the patient's feet and the anesthesiologist 13 at the patient's head. Camera 11 is illustrated as filming the surgeon while camera 12 is illustrated as filming the anesthesiologist. In the example of FIG. 2B, an FMC device 17 may be placed in front of the camera 11. The camera may then start recording (11R). Next, as illustrated in FIG. 1C, the FMC device 17 may be placed in front of the camera 12, which may then start recording (12R). It may be noted that, as illustrated by the example usage, no common event was required to provide for subsequent synchronization of the video captured by the cameras 11 and 12.

Figure 3:
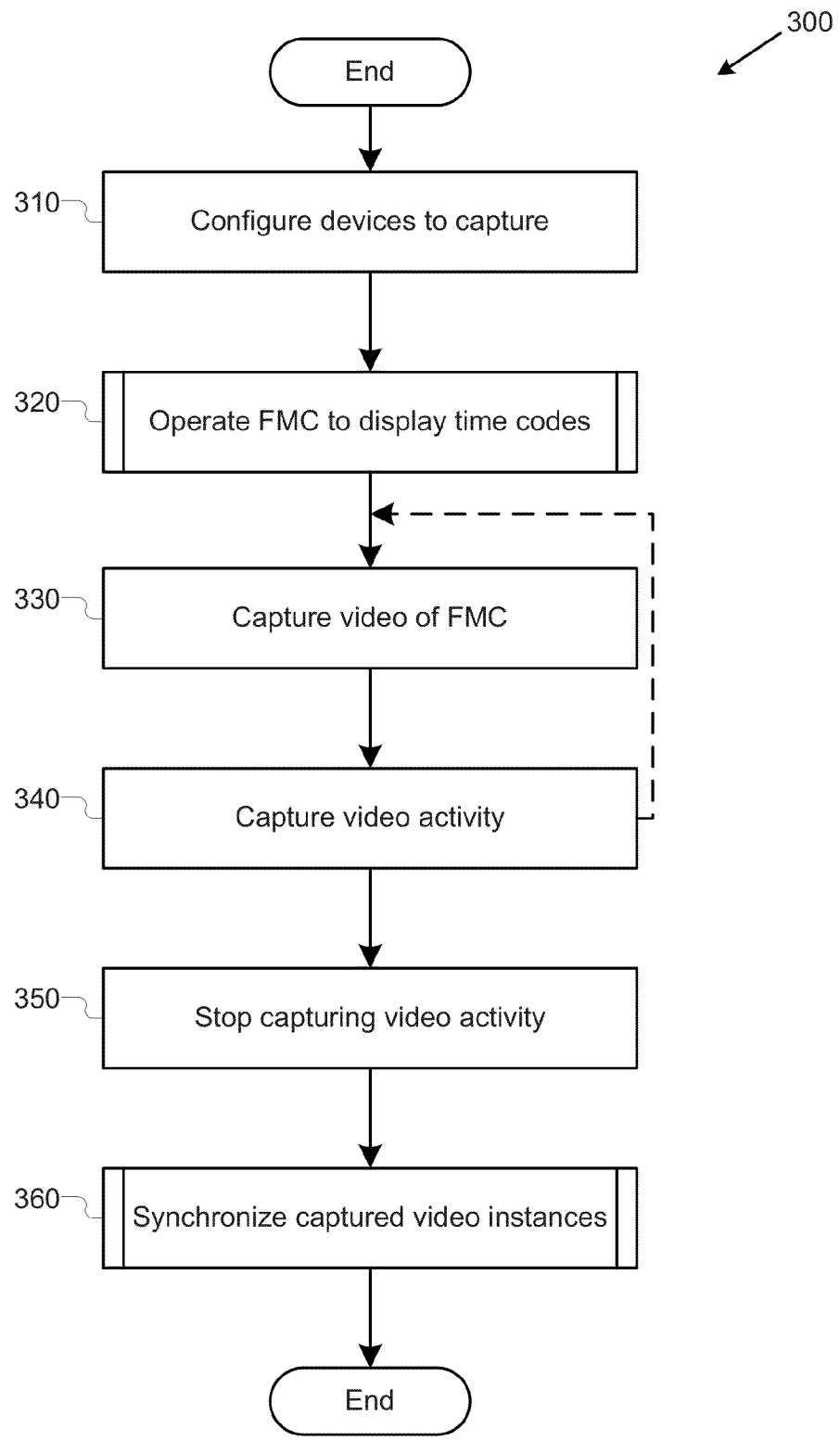
FIG. 3 is a flowchart illustrating operations of an example process for recording and synchronizing video in accordance with various embodiments.

FIG. 3 is a flowchart illustrating operations of an example process 300 for recording and synchronizing video in accordance with various embodiments. While example process 300 illustrates particular operations in a particular order, in various embodiments, operations of process 300 may be reordered, combined, divided into additional operations, and/or omitted entirely. The process may start at operation 310, where multiple video capture devices may be configured to capture video activity. In various embodiments, the video capture devices may be operated to begin capture of video activity at operation 310; in other embodiments, one or more of the video capture devices may be made to begin capture of video activity at a later point. Next, at operation 320, the FMC 100 may be operated to start displaying time codes. Particular examples of operation 320 are described below.

Next, at operation 330, one or more of the video capture devices may be operated to capture video of the FMC 100 as it displays time codes. In various embodiments, such as when the FMC 100 is operated on a portable computing device, operation 330 may include movement of the FMC 100 such that its display is visible to one or more video capture devices. In other embodiments, the video capture devices themselves may be moved to capture video of the FMC 100. In various embodiments, as described herein, if the FMC 100 is executing on a computing device, operation 330 may include capture of video from the display of the computing device itself. Thus, video from a display may be synchronized with video captured from camera and/or lens-based devices.

At operation 340, the video capture devices may capture video activity. It may be noted that, in various embodiments, one or more of the video capture devices may capture video activity other than the FMC 100 before capturing display of time codes by the FMC 100. Thus, in various embodiments, the FMC 100 may not need to be shown to the video capture devices before capture of video activity. As such, the FMC 100 may, in various embodiments, be shown at times that are convenient for the operators of the video capture devices during video capture. Additionally, in various embodiments, the video of the FMC 100 may be captured more than once. For example, video of the FMC 100 may be captured by each video capture device. In some embodiments, video of the FMC 100 may be captured repeatedly even by a video capture device that has previously captured video of the FMC 100. In some embodiments, this repeated capture may allow a user of the embodiments described herein to identify video capture drift. In various embodiments, repeated capture of images from the FMC 100 may be done at regular or irregular intervals; these intervals may be chosen, in various embodiments, based on an assumed or observed drift by one or more video capture devices.

At operation 350, the video capture devices may be stopped from capturing video activity. Next, at operation 360, the captured video instances may be synchronized. Particular examples of operation 360 are described below. The process may then end.

Figure 4:
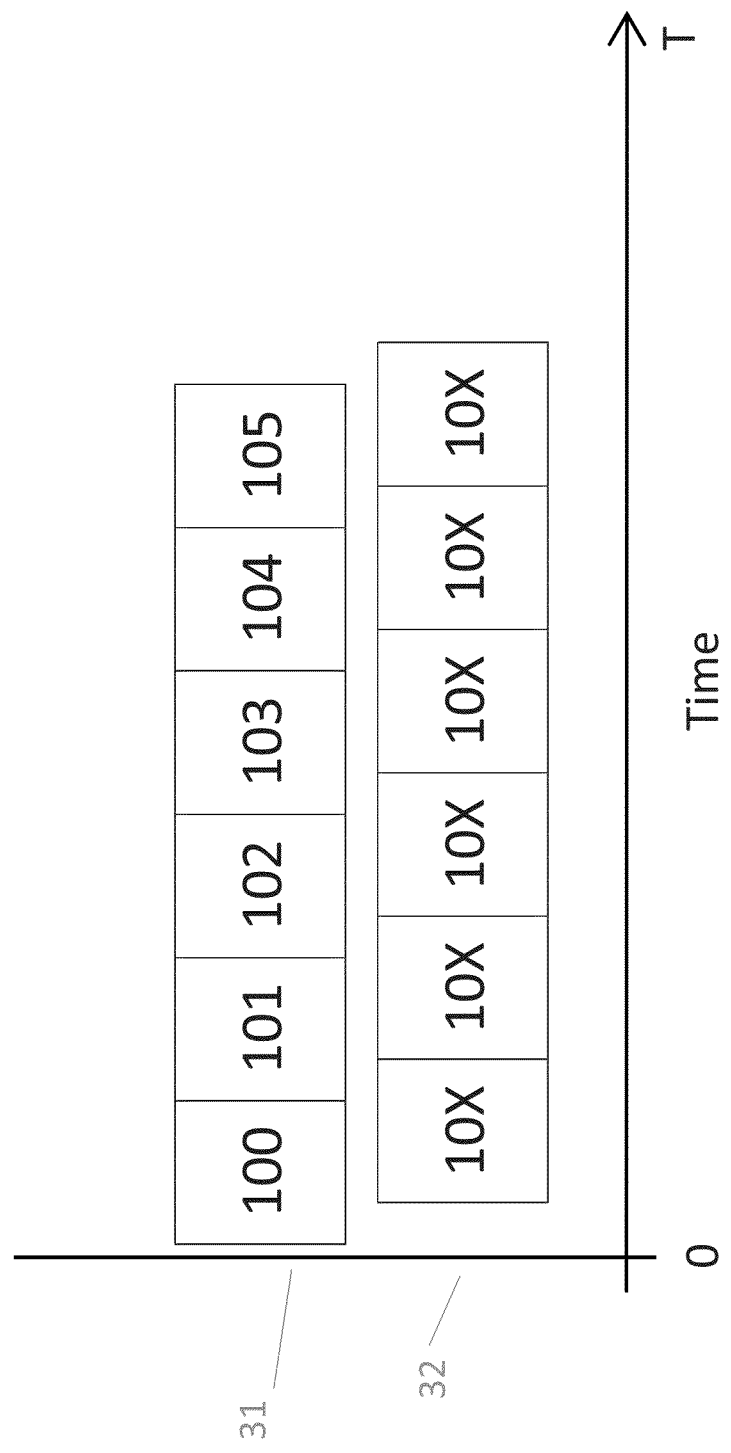
FIG. 4 is a diagram showing example prior art display of time codes.

FIG. 4 is a diagram showing example prior art display of time codes. In the example of FIG. 4, time codes that advance over time are displayed in a single location on a display (row 31). Frames of video in the example are also captured using a video capture frame rate at a similar rate (row 32); additionally, in the example shutter speed (such as time a frame is exposed) is similar to the video capture frame rate. However, Because the time code display and the video capture device are independent, the time codes 31 are shown as offset from the captured video frames 32. Due to the offset, the first video frame was exposed to the time code "100" and time code "101"; thus the resulting frame of video 32 shows "10X" where "X" represents a blurred part of the image.

Figure 5A:
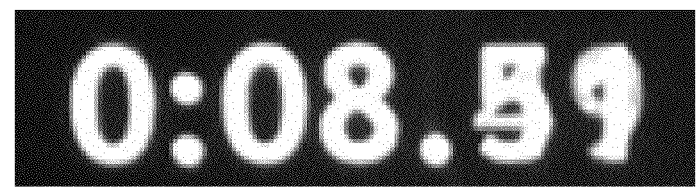
FIGS. 5A and 5B are example prior art displays of time codes.
Figure 5B:
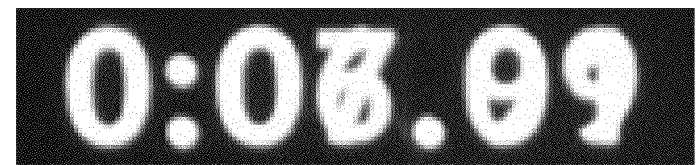

FIGS. 5A and 5B are example prior art captured frames of displayed time codes, such as from a stop watch; the captured codes illustrate this blurring effect. As illustrated, FIGS. 5A and 5B show examples of captured frames of displayed video of time codes that are blurred, such as, for example, due to offset between the video capture and the display of the time codes.

Figure 6:
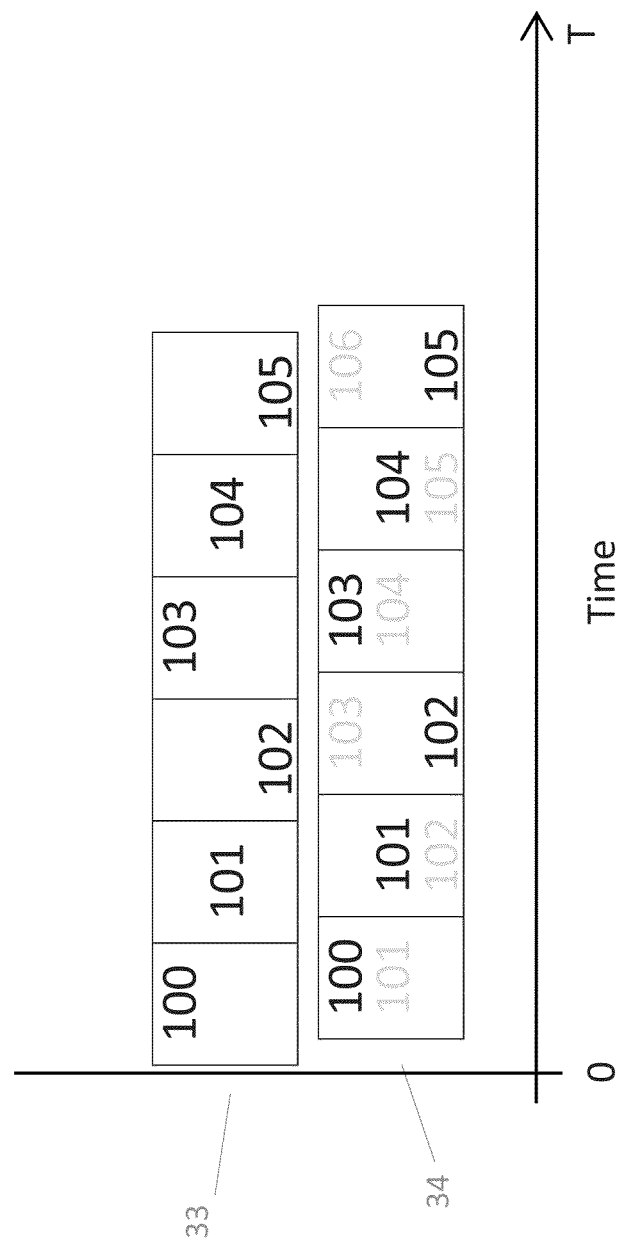
FIG. 6 is a diagram showing example displayed time codes for a frame-marking clock in accordance with various embodiments.

FIG. 6 is a diagram showing example displayed time codes for a frame-marking clock in accordance with various embodiments. In this example, screens of the FMC 100 are displayed over time in row 33, and recorded as frames of video 34. In the example given, the FMC 100 is updated at substantially the same frame rate as the frame capture rate. However, as in the example of FIG. 4, an offset does exist between the updated displays and the captured frames. Thus, the captured frames of the example show multiple time codes. However, unlike in the example of FIG. 4, multiple time codes captured in a single frame do not overlap or otherwise interfere with each other. For example, the first video frame was exposed to the image "100" and image "101", with the image "100" being displayed for a greater part of the frame. Thus the resulting frame of video 32 shows "100" in black and "101" in gray. In various embodiments, the FMC 100, by displaying consecutive time codes in separate, non-overlapping portions of the display, prevents interference and/or blurring from being exhibited even when multiple time codes are captured on a single frame of video.

Figure 7A:
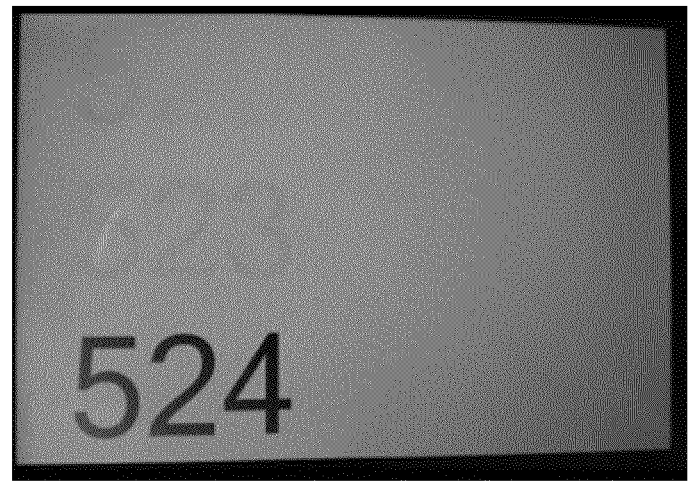
FIGS. 7A and 7B are example displays of time codes of a frame-marking, clock in accordance with various embodiments.
Figure 7B:
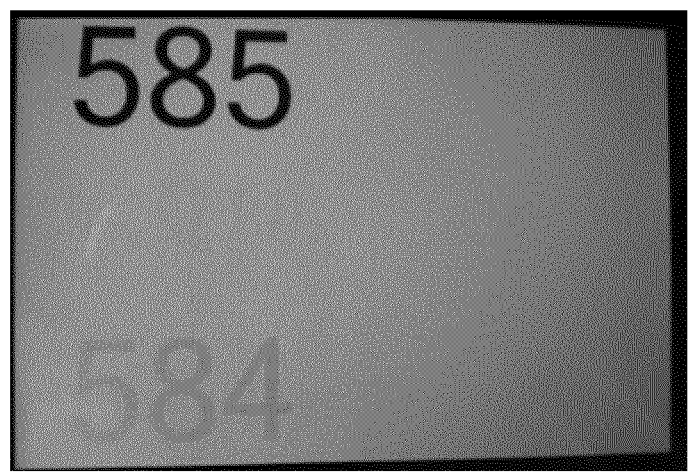

FIGS. 7A and 7B are example frames of captured video displayed by a frame-marking clock in accordance with various embodiments. As can be seen in FIGS. 7A and 7B, the captured frames show that more than one time code is captured on the frame; however, the displayed time codes remain legible and easily identifiable.

As discussed herein, the FMC 100 may be configured to mark individual frames of video with through display of time codes. In various embodiments, the time codes may be displayed as readable unique image and/or images that can be translated into a unit of time. In various embodiments, the FMC 100 may be configured to use Equations (1) through (4) to display these time codes. While particular values and labels are used herein for the sake of explanation, it may be recognized that, in various embodiments, other labels, values, and/or relationships may be used.

In various embodiments, the value FMC_Update_Rate may represent a rate, such as in units of {updates/time}, at which a time code image is updated to a new time code. This update may involve the time code being displayed in a new non overlapping position. In various embodiments, the value Video_Capture_Frame_Rate may represent a rate at which a video capture device records frames of video, such as in units of {frames/time}. In various embodiments, these two values may have a relation identified through the relationship:

$$FMC\_Update\_Rate \geq Video\_Capture\_Frame\_Rate \qquad \text{Equation (1)}$$

In various embodiments, the value FMC_Display_Update_Rate may represent a rate at which a display used by the FMC 100 is updated, such as in units of {updates/time}. In various embodiments, FMC_Display_Update_Rate may have a relation identified through the relationship:

$$\text{FMC\_Display\_Update\_Rate} \geq \text{FMC\_Update\_Rate} \qquad \text{Equation (2)}$$

In various embodiments, if it has been found that if the video capture device is set a high manual shutter speed, the rate at which the FMC 100 s electronic display updates may be modified, such as by increasing the FMC_Display_Update_Rate value.

In various embodiments, the value FMC_NonOverlapping_Positions may represent a number of non-overlapping positions the FMC 100 may utilize to display time codes on the display. In various embodiments, the value MinPositions may represent a minimum number of non-overlapping positions. In various embodiments, these values may be associated with the following relationships:

$$\text{MinPositions} \geq 2 \qquad \text{Equation (2.5)}$$

$$\text{FMC\_NonOverlapping\_Positions} \geq \text{MinPositions} \qquad \text{Equation (3)}$$

In various embodiments, the value FMC_Position_Repeat_Rate may represent a rate at which the FMC 100 may repeat a non-overlapping position, such as in units of {updates/time}. In various embodiments, it may be understood that FMC_Position_Repeat_Rate=(FMC_Update_Rate/FMC_NonOverlapping_Positions).

$$\text{FMC\_Position\_Repeat\_Rate} \leq (\text{Video\_Capture\_Frame\_Rate}/\text{MinPositions}) \qquad \text{Equation (4)}$$

In various embodiments, the FMC 100 may operate in accordance with Equations (1) through (4) such that the values described above adhere to these equations. Table 1, below illustrates potential combinations of assignments of the values described above. In each case, as the table shows, not every assignment satisfies each of Equations (1) through (4). Table 1 illustrates assignments that satisfy an Equation with a 1 and assignments that fail to satisfy an Equation with a "0". In various embodiments, those assignments that satisfy all Equations may be considered valid configurations for the FMC 100. In other embodiments, other criteria for configurations may be utilized.

Reference will now be made to operations of FMC 100 to display time codes on a display using FMC configuration C from Table 1 above. In various embodiments, other configuration may be used.

Figure 8:
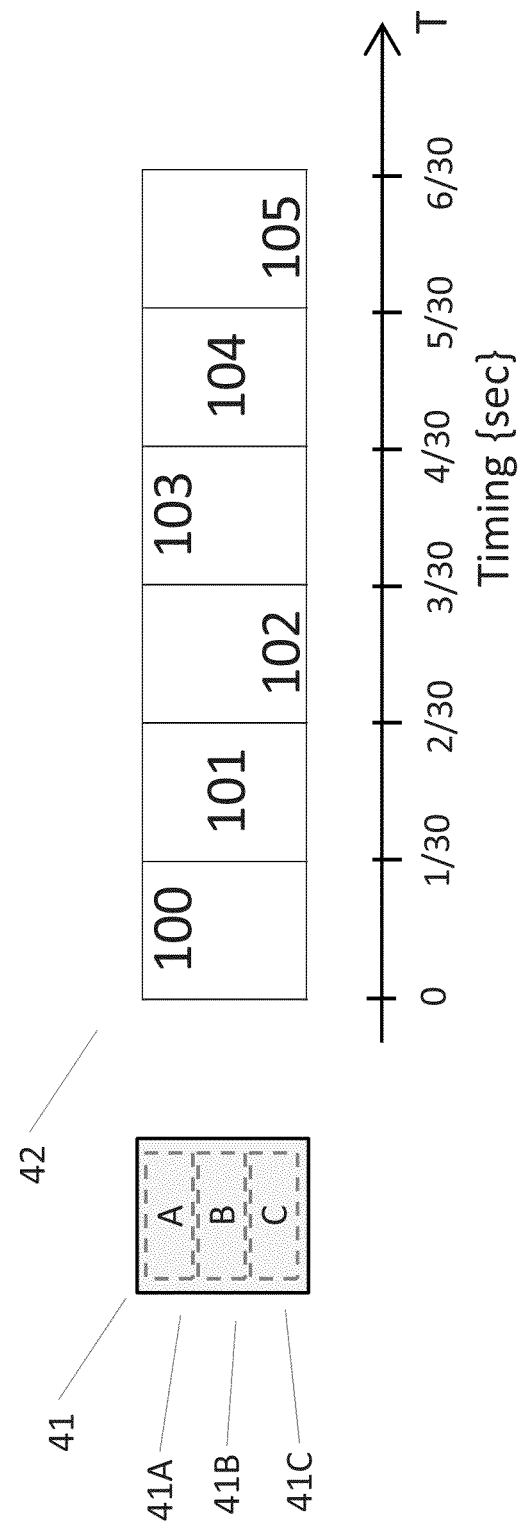
FIG. 8 is a diagram illustrating example time code display locations of a frame-marking clock in accordance with various embodiments.

Referring now to FIG. 8, FIG. 8 is a diagram illustrating example time code display locations of a frame-marking clock in accordance with various embodiments. FIG. 8 illustrates a display 41 that, in various embodiments, includes three non-overlapping display areas 41A, 41B, and 41C. FIG. 8 also illustrates a particular example of display 42 of the time codes at an interval of 1/30 of a second. In alternative embodiments, rather than utilize a column of non-overlapping positions updated bottom to top, the FMC 100 may include, but is not limited to, other configurations, such as a row of positions updated left to right or right to left, diagonal images that update top to bottom or bottom to top, and/or a circle, square or triangle of images updated counter clockwise or clockwise.

Figure 9:
FIG. 9 is a table showing example timing for a frame-marking clock in accordance with various embodiments.

FIG. 9 is a table showing example timing for a frame-marking clock in accordance with various embodiments. As illustrated, in various embodiments, each time code may include a unique image, here a number starting at 100 and illustrated in the UniqueImage column 44. The unique time code images may be rotated down the three display areas 41A, 41B, and 41C, as illustrated in column 45. And, as before, the time code images may be shown at a duration of 1/30 of a second (column 46).

Figure 10:
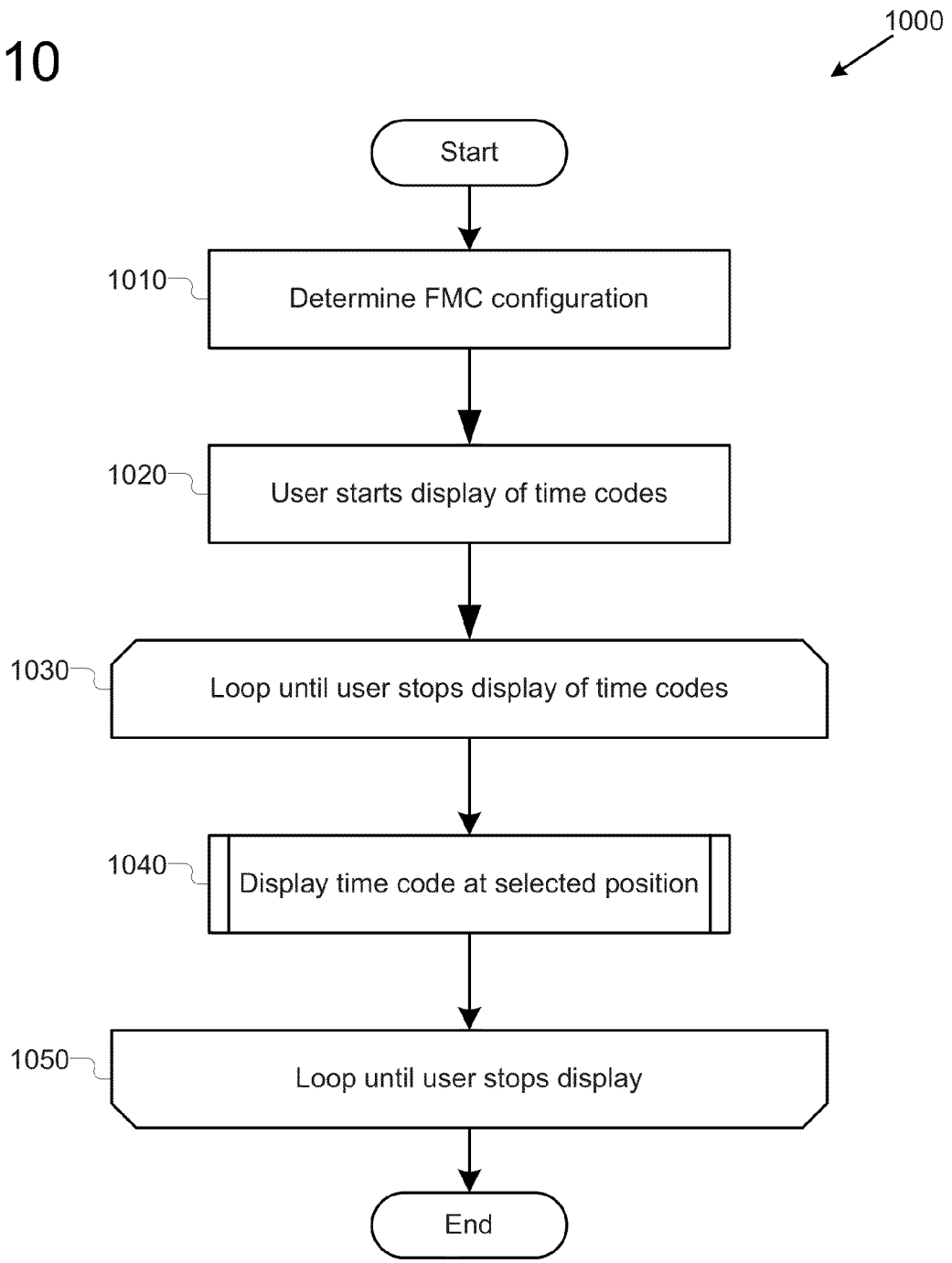
FIG. 10 is a flowchart illustrating operations of an example process for displaying time codes using a frame-marking clock in accordance with various embodiments.

FIG. 10 is a flowchart illustrating operations of an example process for displaying time codes using a frame-marking clock in accordance with various embodiments. While example process 1000 illustrates particular operations in a particular order, in various embodiments, operations of process 1000 may be reordered, combined, divided into additional operations, and/or omitted entirely. In various embodiments, process 1000 may include one or more implementations of operation 320 of process 300 of FIG. 3. The process may start at operation 1010 where a configuration for the FMC 100 may be determined. In various embodiments, the configuration may be configured based on user action and/or automatically configured by the FMC 100. In various embodiments, the configuration may be based at least

TABLE 1

| | Frame Marking Clock (FMC) | | | | | FMC Configurations Validation | | | | | |
|---|---|---|---|---|---|---|---|---|---|---|---|
| Video Device | | FMC | | FMC Non | FMC | | | | | | |
| Video capture frame rate {frames/sec} | FMC Config. | Display Update Rate {updates/sec} | FMC Update Rate {updates/sec} | Overlapping Positions {positions} | Position Repeat Rate {updates/sec} | Equ. 1 | Equ. 2 | Equ. 2.5 | Equ. 3 | Equ. 4 | FMC Config. Valid |
| 30 | A | 30 | 30 | 1 | 30 | 1 | 1 | 0 | 0 | 0 | False |
| 30 | B | 30 | 30 | 2 | 15 | 1 | 1 | 1 | 1 | 1 | True |
| 30 | C | 30 | 30 | 3 | 10 | 1 | 1 | 1 | 1 | 1 | True |
| 60 | D | 60 | 60 | 3 | 20 | 1 | 1 | 1 | 1 | 1 | True |
| 60 | E | 30 | 30 | 3 | 10 | 0 | 1 | 1 | 1 | 1 | False |
| 30 | F | 60 | 30 | 4 | 7.5 | 1 | 1 | 1 | 1 | 1 | True |

In addition to the embodiments described above, in additional embodiments, the FMC 100 may be configured such that each frame may not be required to be stamped with a unique image. Thus, in some embodiments, Equation (1) above could be changed to allow for a slower FMC_Update_Rate such as:

$$\text{FMC\_Update\_Rate} \geq \text{Video\_Capture\_Frame\_Rate}/2 \qquad \text{Equation (1b)}$$

In such embodiments, if the FMC 100 were to be configured to use Equation (1b) in place of Equation (1) configuration E in Table 1 may become a valid configuration for the FMC 100.

in part on settings and/or capabilities of video capture devices being used. In various embodiments, a configuration discussed in Table 1, above, such as Configuration C, may be used.

Figure 12A:
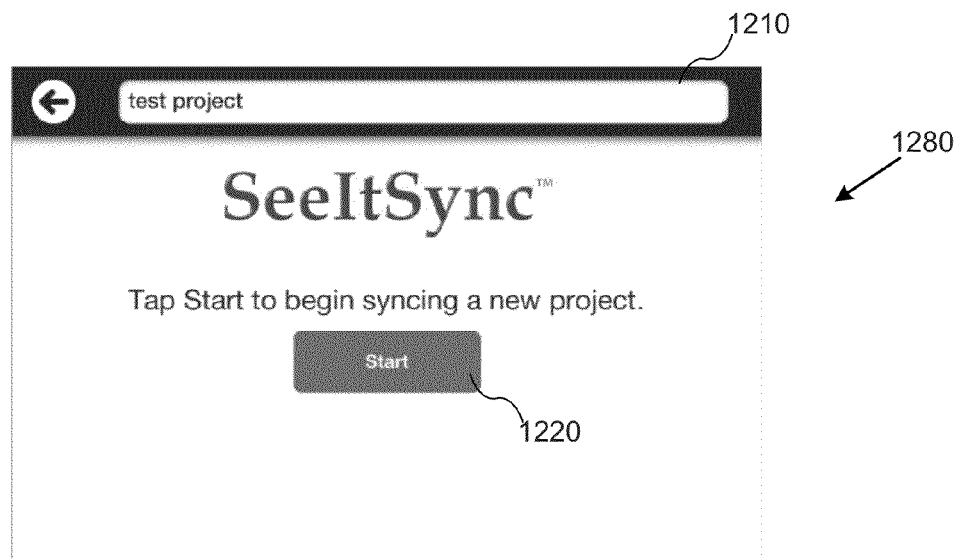
FIGS. 12A-12D are example interfaces for interacting with a frame-marking clock in accordance with various embodiments.
Figure 12B:
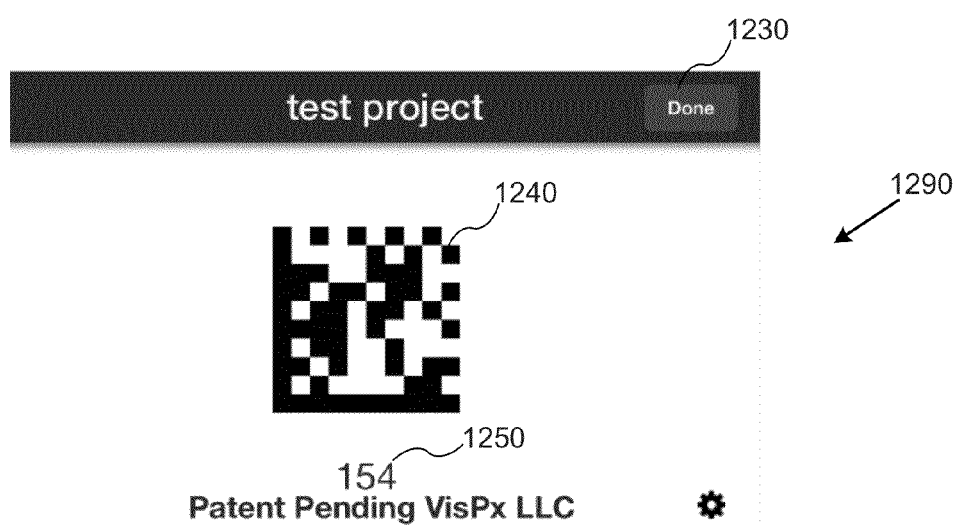

Next, at operation 1020 a user may begin display of time codes. Referring now to FIGS. 12A and 12B, example interface is shown for starting display of time codes using the FMC 100. As illustrated in FIG. 12A, in various embodiments an example user interface 1280 is illustrated. As illustrated in the example, the user interface 1280 may allow a user to enter a label for a video capture project into the FMC 100 through a user interface element 1210. The user interface 1280 may also provide a user interface element 1220 through which a user may indicate the user's interest in starting generation and display of time codes for a video capture project. In various embodiments, activation of user interface element 1220 may start generation and display of time codes.

Returning to FIG. 10, at loop operation 1030, a loop may be begun until the user stops display of time codes. At operation 1040, a time code may be displayed at a selected position. Particular examples of operation 1040 may be found below with reference to FIG. 11. Next, the loop may be continued at loop operation 1050 until the user stops display of time codes. The process may then end.

Figure 11:
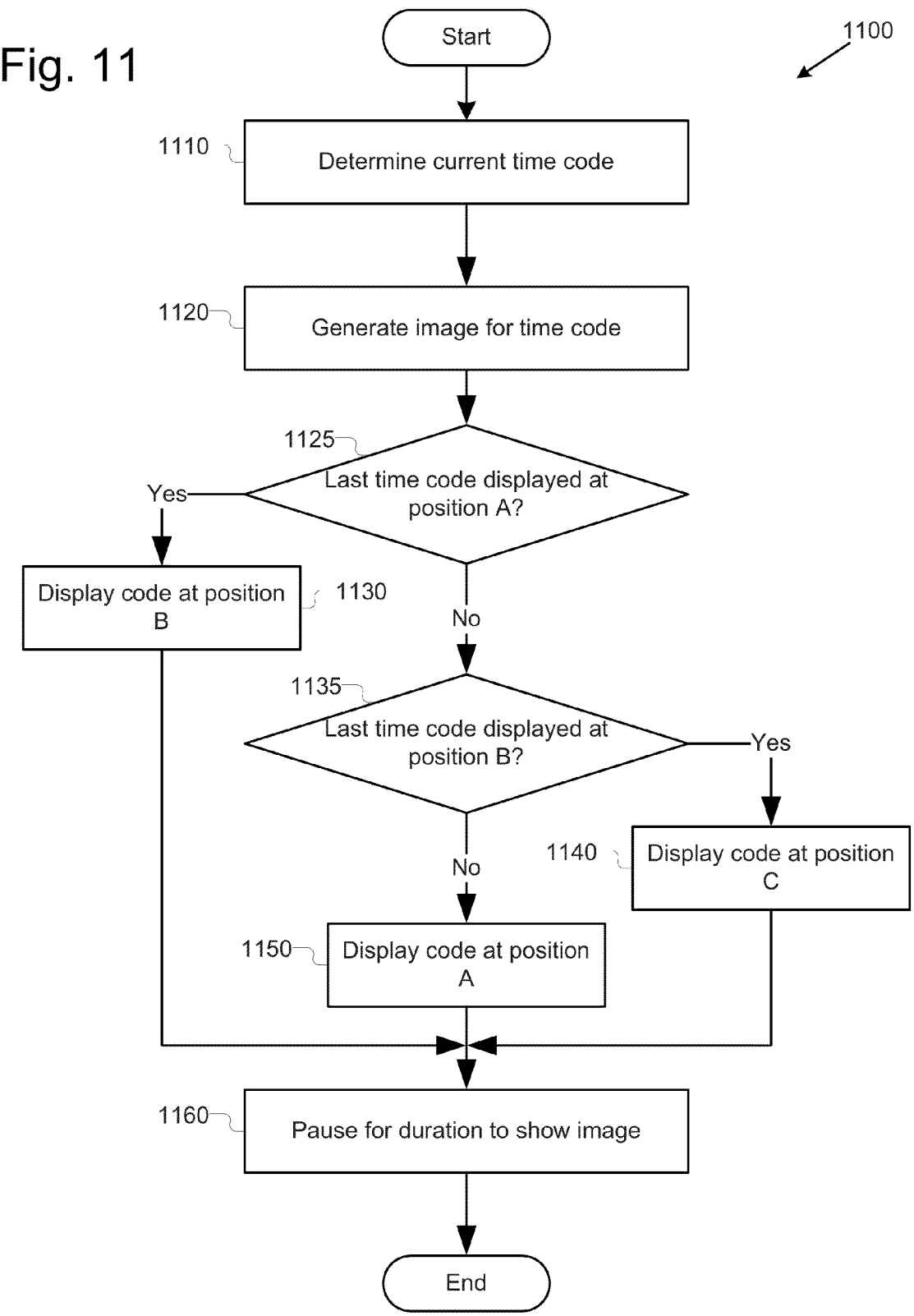
FIG. 11 is a flowchart illustrating further operations of an example process for setting a position for display of a time code using a frame-marking clock in accordance with various embodiments.

FIG. 11 is a flowchart illustrating further operations of an example process for setting a position for display of a time code using a frame-marking clock in accordance with various embodiments. While example process 1100 illustrates particular operations in a particular order, in various embodiments, operations of process 1100 may be reordered, combined, divided into additional operations, and/or omitted entirely. In various embodiments, process 1100 may include one or more implementations of operation 1040 of process 1000 of FIG. 10. The process may begin at operation 1110, where the FMC 100 may determine the current time code (e.g. "100"). In various embodiments, the FMC 100 may determine the current time code by referencing an internal time source, such as an internal clock of a device upon which the FMC 100 is executing. In other embodiments, the FMC 100 may determine the current time code based at least in part on an external source, such as a networked clock, or another device executing another instance of the FMC 100. Thus, in various embodiments, multiple instances of FMC 100 may remain synchronized themselves in order to facilitate capture and synchronization of video where capture of a single FMC 100 may be difficult.

Next, at operation 1120, the FMC 100 may generate an image for the time code. In some embodiments, the image generated may be a human-readable image, such as, for example, display of the time code as a series of numbers. In other embodiments, at operation 1120, the FMC 100 may generate a machine-readable code, such as a two-dimensional bar code, data matrix, or QR code. In various embodiments, other machine-readable codes may be used, including static or dynamic images that may be translatable into a unit of time.

Next, the FMC 100 may determine a location to display the generated time code image. Thus, at decision operation 1125, the FMC 100 may determine if the last time code image was displayed at position A. If so, then at operation 1030, the FMC 100 may display the current time code image at position B. If not then, at decision operation 1135, the FMC 100 may determine if the last time code image was displayed at position B. If so, then at operation 1140, the FMC 100 may display the current time code image at position C. If not, then at operation 1150, the FMC 100 may display the current time code image at position A. In various embodiments regardless of at which position the time code image is displayed at, at the process may then continue to operation 1160, where the FMC 100 may pause to allow the time code image to be shown. In various embodiments, the FMC 100 may pause for the value DurationToShowImage. In various embodiments, the value DurationToShowImage may be equal to the value 1/FMC_Update_Rate. The process may then end.

Referring now to FIG. 12B, FIG. 12B shows an example user interface 1290 including a machine-readable time code image 1240, as well as a human-readable time code image 1250. As illustrated, the time code images 1240 and 1250 are displayed in the middle display position, roughly corresponding to position B as discussed above.

Figure 12C:
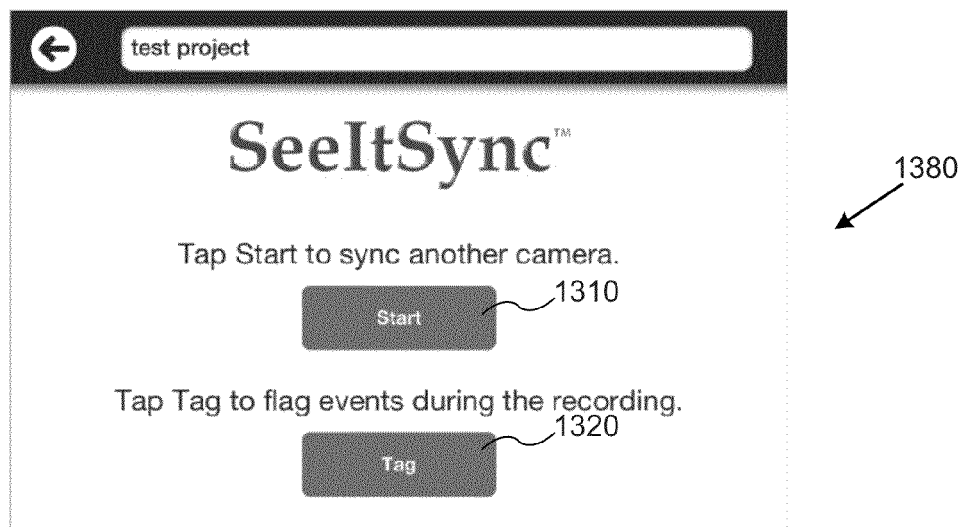
Figure 12D:

FIGS. 12B-12D also show additional user interface features. For example, the user interface 1290 also shows an example user interface element 1230 for stopping display of time codes, such as described herein. In FIG. 12C, an example user interface 1380 is shown, such as after display of time codes has ended, that facilitates the continued display of time codes. Thus, the example user interface 1380 includes a user interface element 1310 for returning to an interface displaying time codes.

The example user interface 1380 also includes a user interface element 1320 for obtaining a user interface for tagging events during video capture. In FIG. 12D, an example user interface 1390 is shown, with a user interface field 1330 that a user may tap to "tag" an event. In various embodiments, using the user interface of 12D, a user may tap to cause the FMC 100 to record a particular time code that may be contemporaneous with the user's tap. These recorded time codes may be provided to the user by the FMC 100. In various embodiments, by tracking these recorded moments, the user may be able to identify events that may have occurred during capture of video. For example, a coach recording a basketball game may tag each rebound of the basketball by a particular player. The resulting recorded time codes may allow the coach to review the captured video and flag the corresponding moments for review with the player.

Figures 13A, 13B:
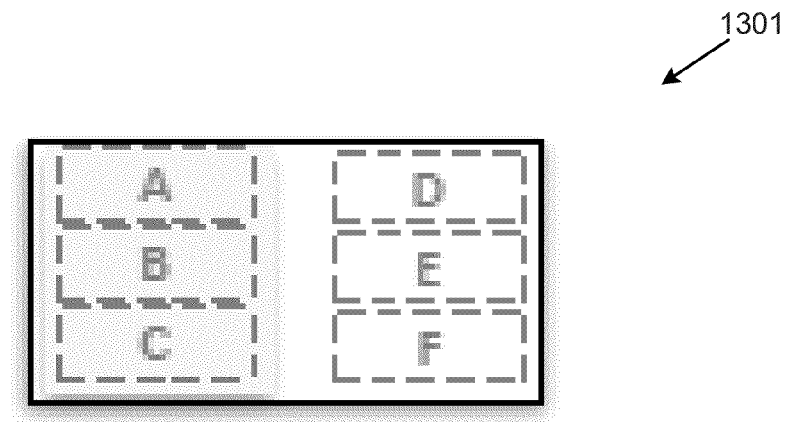
FIGS. 13A-13E are example implementations of alternative display of time codes in accordance with various embodiments.

FIGS. 13A-13E are example implementations of alternative display of time code images in accordance with various embodiments. For example, FIG. 13A illustrates an example display 1301 that includes six non-overlapping display areas. As seen in table 1302 of FIG. 13B, in various embodiments, time code images may be displayed in non-overlapping display areas white allowing the images to overlap in time. Thus, in the example given, a new time code image may be displayed every 1/60 of a second, while each time code image is displayed for duration of 1/30 of a second. In the example shown, the images may rotate across and then down in the display 1301, such as A-D-B-E-C-F. In other embodiments, other display areas and/or display orders may be used.

Figure 13C:
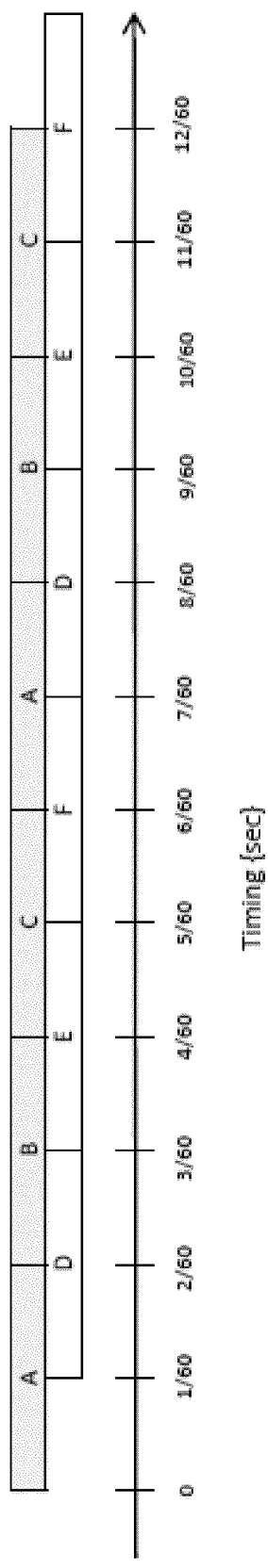
Figure 13D:
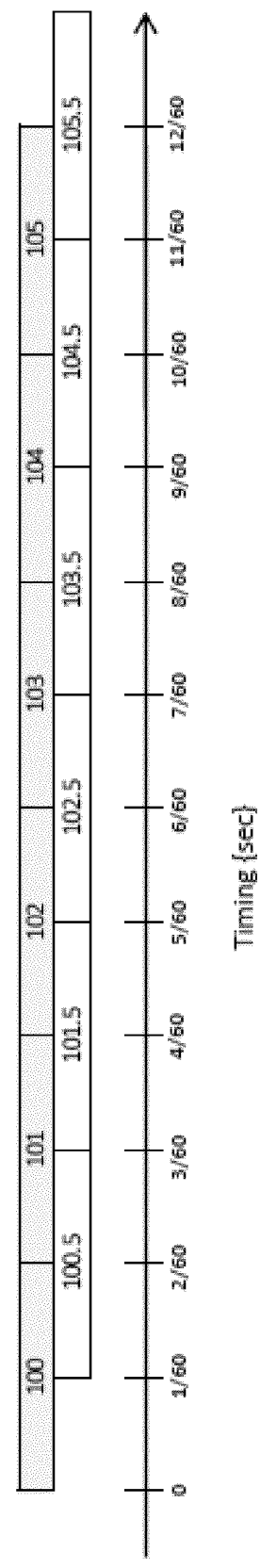
Figure 13E:
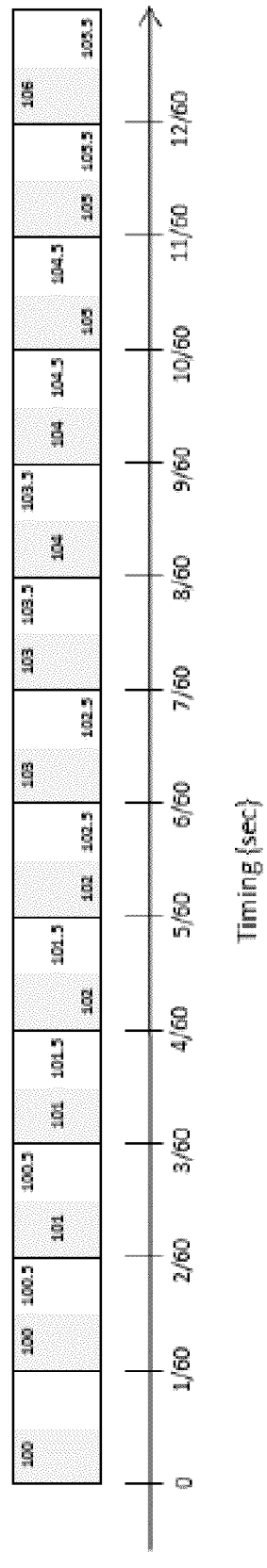

In various embodiments, the example display of FIGS. 13A-13E may be utilized to avoid a potential situation wherein a frame of displayed time code images may be captured at the exact midpoint between display of two time code images. As illustrated, the example of FIG. 13C shows an example graphical representation of how the display area (which is indicated in the ImageLocation column of FIG. 13A) may change with each time code update. FIG. 13D shows an example graphical representation of how the time code images (which are indicated in the UniqueImage column of FIG. 13A) may change with each time code update. FIG. 13E shows example display updates of the FMC 100 for each timing update.

In various embodiments, when the FMC 100 is shown to a video capture device, multiple unique time code images may be recorded. Visible time code images may be captured and an average code value can be found. The average time code value may, in various embodiment, be used as the time code. In various embodiments, rather than taking an average, a darkest, or otherwise most visible, time code image may be chosen to determine the time code for the frame. In various embodiments, such a technique may provide for one and FMC 100 under one FMC configuration to be used to sync both 30 frames per second video capture devices and 60 frame per second video capture devices to near frame level accuracy.

Figure 14:
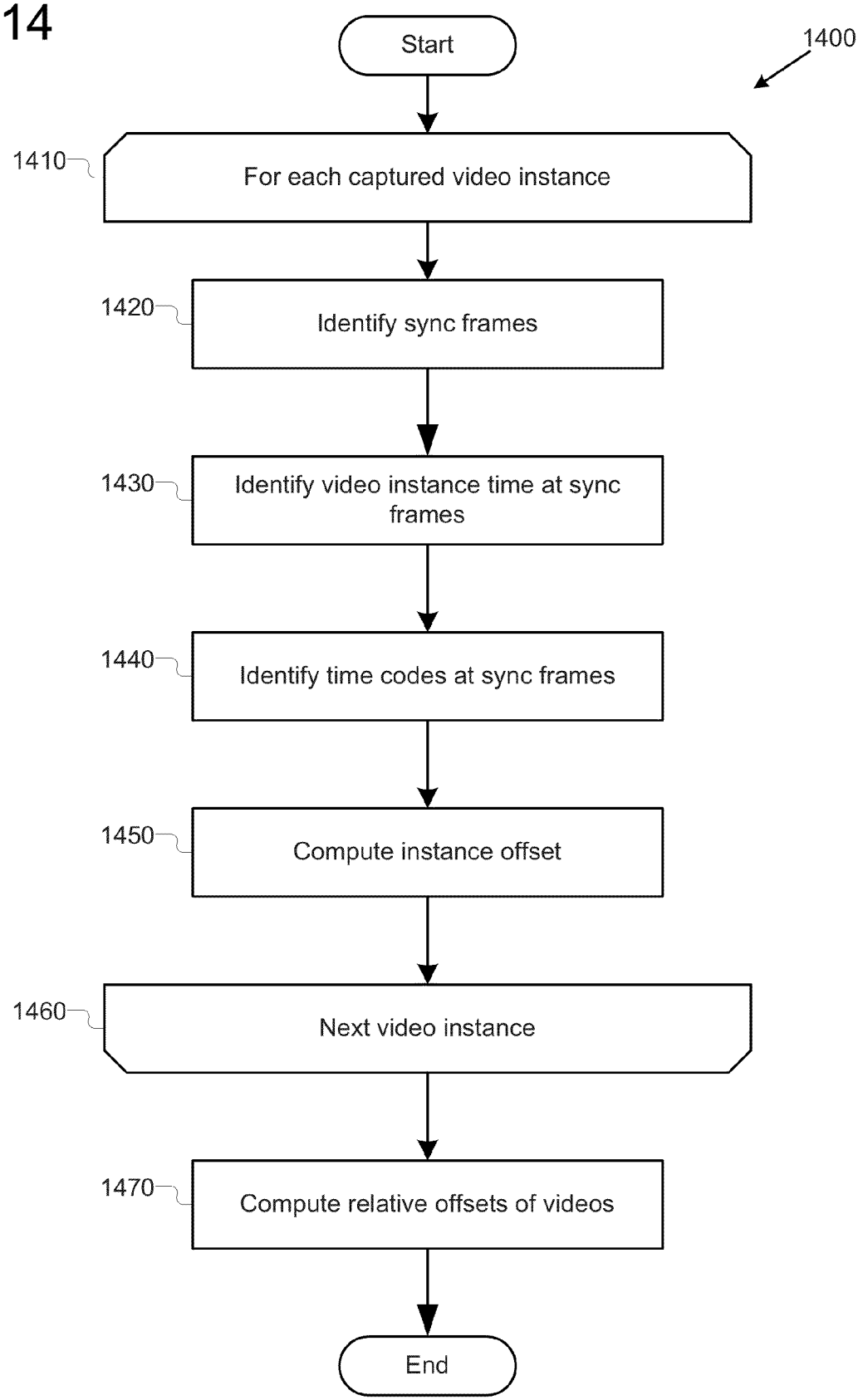
FIG. 14 is a flowchart illustrating operations of an example process for synchronizing video in accordance with various embodiments.

FIG. 14 is a flowchart illustrating operations of an example process for synchronizing video in accordance with various embodiments. While example process 1400 illustrates particular operations in a particular order, in various embodiments, operations of process 1400 may be reordered, combined, divided into additional operations, and/or omitted entirely. In various embodiments, process 1400 may include one or more implementations of operation 360 of process 300 of FIG. 3. The process may begin at operation 1410 where a loop may be begun for each captured video instance.

Various operations of process 1400 may be performed with reference to particular values, as described herein. In various embodiments, operations may be performed with reference to sync frames, which may include frames of captured video in which the FMC 100 has displayed a time code image during capture to mark the frames. In various embodiments, the value $f_m$ may indicate a number of sync frames to be used to synchronize each video m during the recording of two or more total videos Z as described below. These values may, in various embodiments be related according to the relationships below:

$$f_m \geq 1 \quad \text{Equation (5)}$$

$$Z \geq 2 \quad \text{Equation (6)}$$

In various embodiments, the sync frames may be marked with a unique time code image, which may be called Image_FMC$_m$, that may be associated with a time code. In various embodiments, a sync frame may have more than one readable time code image. The FMC 100 may, in various embodiments select a time code image from visible time code images, such as by choosing the darkest or most legible time code image. In various embodiments, the FMC 100 may be configured to select images in a consistent manner between sync frames to maximize synchronization. Additionally, in various embodiments, if more than one time code image is visible, multiple time code images may be taken and an average code value may be found. The average time code value may then be used as the time code.

In various embodiments, the value Z may represent a number of videos to synchronize. In various embodiments, a position in units of time from the beginning of a particular video in at which a sync frame Image_FMC$_m$ is located may be represented by the value Position$_m$. In various embodiments, the Image_FMC$_m$ may be converted into units of time and represented by the value Time_FMC$_m$. Similarly the corresponding Position$_m$ may be converted into the same units of time and represented by the value Time_Position$_m$. In various embodiments, syncing software may have a precision to differentiate between different frames of video to improve results in obtaining Time_Position$_m$.

In various results, syncing software may normalized a video m to find at what FMC Time the video began as shown in the following relationship:

$$\text{VideoBeginning\_Time\_FMC}_m = \text{Time\_FMC}_m - \text{Time\_Position}_m \quad \text{Equation (7)}$$

In various embodiments, video m may be further synchronized to a different video n where Z total videos were recorded. The relationships associating these values may be given as follows:

$$1 \leq m \leq Z \quad \text{Equation (8)}$$

$$1 \leq n \leq Z \quad \text{Equation (9)}$$

$$m \neq n \quad \text{Equation (10)}$$

In various embodiments, time offsets may be found between two different videos in and n according to the following relationship:

$$\text{TimeOffset}_{m \text{ to } n} = \text{VideoBeginning\_Time\_FMC}_n - \text{VideoBeginning\_Time\_FMC}_m \quad \text{Equation (11)}$$

In various embodiments, the offsets may then be used according to the following relationship to sync video.

$$\text{Time\_Position}_n = \text{TimeOffset}_{m \text{ to } n} + \text{Time\_Position}_m \quad \text{Equation (12)}$$

Returning now to FIG. 14, at operation 1420, sync software 150 may identify one or more sync frames. In various embodiments, the sync frames may be identified by sync software 150 after processing the video in sync software 150. In various embodiments, the sync software 150 may be configured to automatically search for and discover one or more sync frames in the processed video. In particular, this automatic discovery may be aided by the use of machine-readable time code images. In other embodiments, a user may manually play and pause the captured video instance to identify the location of sync frames.

Next, at operation 1430 the sync software 150 may identify video instance times at each sync frame. Next, at operation 1440, the sync software 150 may identify time code images at the sync frames. In various embodiments, if machine-readable time code images are used, the sync software 150 may translate these time code images into time codes. In various embodiments, the translation may include various techniques, including optical character recognition (OCR) software, barcode reading software, or other image analysis software.

Next, at operation 1450, the sync software 150 may compute an instance offset for the instance of video. In various embodiments, the offset of the instance may be computed using Equation (7) above. Next, at loop operation 1460, the sync software 150 may continue the process for the next instance of video. At operation 1470, the sync software 150 may compute relative offsets of videos, such as according to Equation (11) above. The process, having computed the relative offsets of the videos, may then end.

Figure 15A:
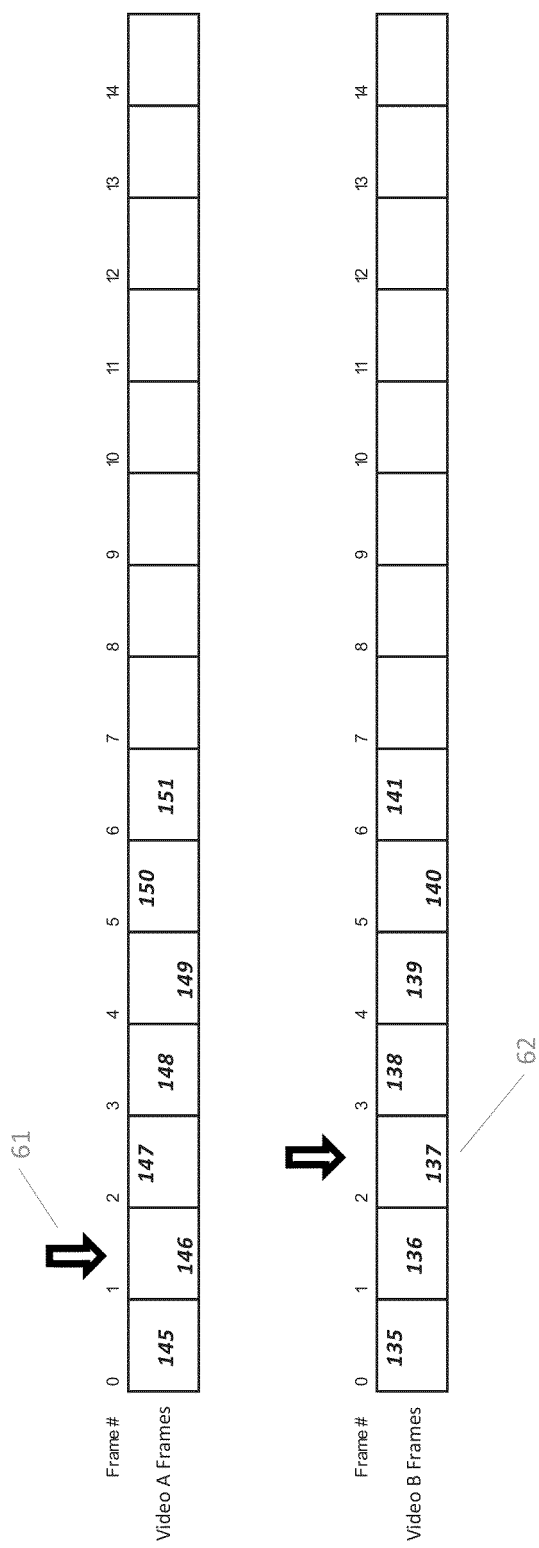

FIGS. 15A-15C are diagrams illustrating example synchronization of frames of video marked by a frame-marking clock in accordance with various embodiments. In the example illustrated by FIGS. 15A-15C, video capture devices were started while filming the FMC 100, causing the captured video to have time code images captured on it as shown in FIG. 15A. After each video is processed in the sync software 150 the time coded from the captured time code images may be obtained for each captured video. In the example of FIG. 15A, the first fourteen frames of Video A and Video B are shown. In the example, the first six frames have time code images on them and thus may be called sync frames. It may be noted that white the sync frames of FIG. 15A are illustrated at the beginning of the captured video, in other examples, the sync frames may be located elsewhere on the captured video. In the example below, the sync frames used are shown in FIG. 15A with arrows 61 and 62.

In the first operation, Videos A's Time_Position$_A$ {sec} may be found at the sync frame shown by arrow 61:

$$\text{Position}_A \{\text{Frames}\} = 1$$

$$\text{VideoA\_FrameRate}\{\text{Frames/sec}\} = 30$$

-continued $$\text{Time\_Position}_A \{\text{sec}\} = \text{Position}_m / \text{VideoA\_FrameRate}$$
$$= 1/30$$
$$= 0.033$$

In the next operation, Time_FMC$_A$ {sec} may be found for Videos A's sync frame 61:

$$\text{Image\_FMC}_A \{\text{Number}\} = 146$$
$$\text{FMC\_Update\_Rate}\{\text{Number/sec}\} = 30$$
$$\text{Time\_FMC}_A\{\text{sec}\} = \text{Image\_FMC}_A / \text{FMC\_Update\_Rate}$$
$$= 146/30$$
$$= 4.867$$

In the next operation a time the video began may be found using Equation (7)

$$\text{VideoBeginning\_Time\_FMC}_A\{\text{sec}\} = \text{Time\_FMC}_A - \text{Time\_Position}_A$$
$$= 4.8667 - 0.0333$$
$$= 4.833$$

Next, VideoBeginning_Time_FMC$_B$ may be found for Video B using sync frame shown by arrow 62. This may be done using a similar set of operations as shown above.

$$\text{VideoBeginning\_Time\_FMC}_B\{\text{sec}\} = 4.500$$

Next, time offsets between the videos may be found using Equation (11):

$$\text{TimeOffset}_{A \text{ to } B}\{\text{sec}\} = \text{VideoBeginning\_Time\_FMC}_A -$$
$$\text{VideoBeginning\_Time\_FMC}_B$$
$$= 4.833 - 4.500$$
$$= 0.333$$

The time offset of TimeOffset$_{A \text{ to } B}$ position of Video B may be found from the position of A using Equation (12). Thus, if Video A is at Position of 0.100 {sec} then Video B needs to be at Position 0.433 to by synchronized, as shown below:

$$\text{Position}_B\{\text{sec}\} = \text{TimeOffset}_{A \text{ to } B} + \text{Position}_A$$
$$= 0.333 + 0.100$$
$$= 0.433$$

FIGS. 15B and 15C further illustrate the above-detailed offset calculation example. In the examples of FIG. 15B, light gray time code images 63 are illustrated as being added to Video B to show what time codes would be associated with the frames of Video B if Video B were still capturing the FMC 100 while Video A was capturing the FMC 100. Additionally, in the example of FIG. 15B, Video A and Video B are put on a common timeline 64 to visually demonstrate the synchronization by aligning the FMC 100 numbers. FIG. 15C shows a similar illustration, with the video position and the time codes illustrated in units of seconds. From the above example if Video A is at Position of 0.100 {sec} (65S) then Video B needs to be at Position 0.433 (66S).

In various embodiments, it may be desired to calculate more than one offset using more than one sync frame. This may, in various embodiments, improve the accuracy of the offsets. Also, in various embodiments, a user may desire to find a time offset at the start of the video and the end of the video. The use of two offsets may be helpful in situations where video drift occurs during long recordings, such as when two different video capture devices capture video at slightly different overall playback rates. In such scenarios, when there is drift between two video capture devices, the beginning of a video can be synchronized with a time offset found at the start of the video represented by Start_TimeOffset$_{m \text{ to}}$. However, the end of the video may not synchronize as well using the same Start_TimeOffset$_{m \text{ to } n}$. Thus, in various embodiments, two offsets may be found such as represented by Start_TimeOffset$_{m \text{ to } n}$ and End_TimeOffset$_{m \text{ to } n}$. These may be found, in various embodiments, by using process 1200 of FIG. 12 and Equations (7) through (11) above. The Time_Position$_m$ used to find each offset may shown in Table 2 along with the corresponding TimeOffset$_{m \text{ to } n}$

TABLE 2

|  | TimeOffset$_{m \text{ to } n}$ | Time_Position$_m$ |
|---|---|---|
| Start of video | Start_TimeOffset$_{m \text{ to } n}$ | Start_Time_Position$_m$ |
| End of video | End_TimeOffset$_{m \text{ to } n}$ | End_Time_Position$_m$ |

In various embodiments, the time offsets found in Table 2 may be used by having the first half of the videos use the Start_TimeOffset$_{m \text{ to } n}$ offset value and the second half use the End_TimeOffset$_{m \text{ to } n}$ offset value. In various embodiments, the sync software 150 may use a linear equation to create a function of the time offset based on time position of one of the videos, as shown in the relationships below:

$Y(x)$=slope*$x$+$y$_intercept

X=Time_Position$_m$

Y(x)=TimeOffset$_{m \text{ to}}$(Time_Position$_m$)

A relationship for TimeOffset$_{m \text{ to } n}$ as a function of Time_Position$_m$ may be given by Equation (13):

$$\text{TimeOffset}_{m \text{ to } n}(\text{Time\_Position}_m) = \text{slope}*\text{Time\_Position}_m + y\_\text{intercept} \quad \text{Equation (13)}$$

Table 3 illustrates values from Table 2 that have been replaced by standard point slope variables:

TABLE 3

|  | TimeOffset$_{m \text{ to } n}$ | Time_Position$_m$ |
|---|---|---|
| Start of video | $Y_1$ | $X_1$ |
| End of video | $Y_2$ | $X_2$ |

Point slope equations, such as those below, may be used to find slope and y_intercept.

slope=$(Y_2-Y_1)/(X_2-X_1)$ $y$_intercept=$Y_1$-(slope*$X_1$)

In various embodiments, if the video drift is linear in nature, Equation (13) may be used to find a specific time offset for each Time_Position$_m$ and Equation (12) may be used to sync the video.

Figure 16:
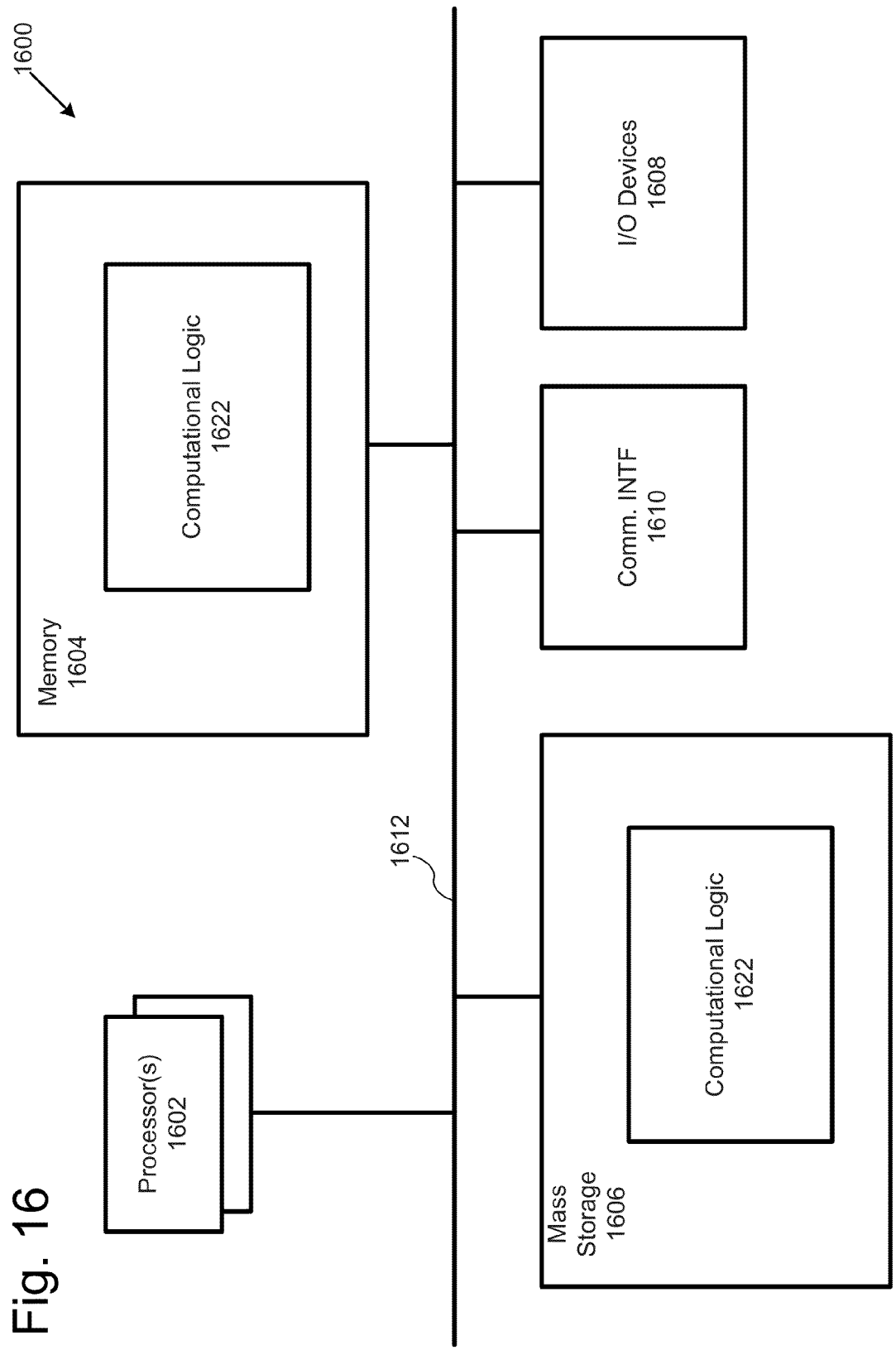
FIG. 16 illustrates an example computing environment suitable for practicing the disclosure, in accordance with various embodiments.

Referring now to FIG. 16, an example computer suitable for use in accordance with various embodiments, is illustrated. As shown, computer 1600 may include one or more processors or processor cores 1602, and system memory 1604. For the purpose of this application, including the claims, the terms "processor" and "processor cores" may be considered synonymous, unless the context clearly requires otherwise. Additionally, computer 1600 may include mass storage devices 1606 (such as diskette, hard drive, compact disc read only memory (CD-ROM) and so forth), input/output devices 1608 (such as display, keyboard, cursor control and so forth) and communication interfaces 1610 (such as network interface cards, modems and so forth). The elements may be coupled to each other via system bus 1612, which may represent one or more buses. In the case of multiple buses, they may be bridged by one or more bus bridges (not shown).

Each of these elements may perform its conventional functions known in the art. In particular, system memory 1604 and mass storage devices 1606 may be employed to store a working copy and a permanent copy of the programming instructions implementing the operations described herein. The various elements may be implemented by assembler instructions supported by processor(s) 1602 or high-level languages, such as, for example, C, that can be compiled into such instructions.

The permanent copy of the programming instructions may be placed into permanent storage devices 1606 in the factory, or in the field, through, for example, a distribution medium (not shown), such as a compact disc (CD), or through communication interface 1610 (from a distribution server (not shown)). That is, one or more distribution media having an implementation of the agent program may be employed to distribute the agent and program various computing devices.

The number, capability and/or capacity of these elements 1610-1612 may vary, depending on how computer 1600 is used. Their constitutions are otherwise known, and accordingly will not be further described.

Figure 17:
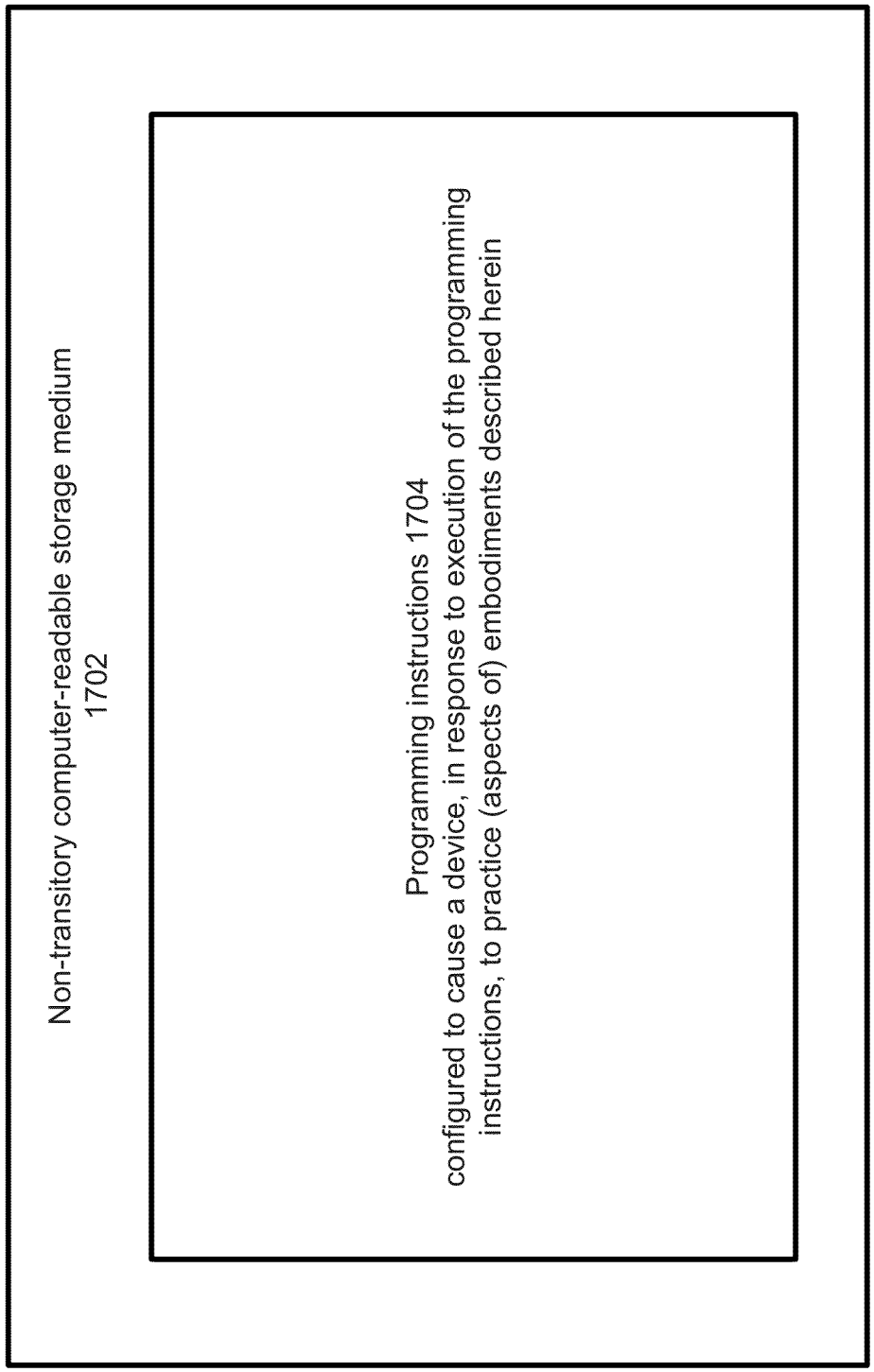
FIG. 17 illustrates an example storage medium with instructions configured to enable an apparatus to practice the present disclosure, in accordance with various embodiments.

FIG. 17 illustrates an example non-transitory computer-readable storage medium having instructions configured to practice all or selected ones of the operations earlier described in accordance with various embodiments. As illustrated, non-transitory computer-readable storage medium 1702 may include a number of programming instructions 1704. Programming instructions 1704 may be configured to enable a device, e.g., computer 1600, in response to execution of the programming instructions, to perform, e.g., various operations of the processes described herein. In alternate embodiments, programming instructions 1704 may be disposed on multiple non-transitory computer-readable storage media 1702 instead.

Referring back to FIG. 16, for one embodiment, at least one of processors 1602 may be packaged together with computational logic 1622 configured to practice aspects of the processes described herein. For one embodiment, at least one of processors 1602 may be packaged together with computational logic 1622 configured to practice aspects of the processes described herein to form a System in Package (SiP). For one embodiment, at least one of processors 1602 may be integrated on the same die with computational logic 1622 configured to practice aspects of the processes described herein. For one embodiment, at least one of processors 1602 may be packaged together with computational logic 1622 configured to practice aspects of the processes described herein to form a System on Chip (SoC). For at least one embodiment, the SoC may be utilized in, e.g., but not limited to, a computing tablet.

The following paragraphs describe examples of various embodiments. In various embodiments, a computer-implemented method for facilitating synchronization of captured video is described. The method may include displaying, by a computing device, a plurality of time code images respectively representing a plurality of time codes based on a common time base, such that, when the time code images are visually captured on video, each time code may be uniquely identified on the video.

In various embodiments, displaying the plurality of time code images may further include displaying the plurality of time code images such that, when the time code images are visually captured on video, each frame of the video may be uniquely identified by the represented time codes.

In various embodiments, the computing device may be coupled to a display, and displaying the plurality of time code images may include displaying the plurality of time code images on the display such that two time code images representing consecutive time codes may be displayed in non-overlapping portions of the display.

In various embodiments, displaying the plurality of time code images may include displaying human-readable time code images. In various embodiments, displaying the plurality of time code images may include displaying machine-readable time code images. In various embodiments, displaying machine-readable time code images may include displaying two-dimensional bar codes.

In various embodiments, the computing device may include a portable device including a display and may be configured to be moved to different physical locations to be captured. In various embodiments, the method may further include receiving, by the computing device, an indication that a user wishes to store a capture of a particular time code and storing a capture of the time code for later output. In various embodiments, receiving the indication may include receiving an activation of a user interface element of an interface of the computing device by the user and storing the capture of the time code may include storing a capture of a time code that is contemporaneous with the activation.

In various embodiments, the method may further include synchronizing the common time base with another computing device that is also configured to display time code images. In various embodiments, the method may further include determining the common time base based on an internal clock of the computing device.

In various embodiments, an other method for facilitating the synchronization of a plurality of captured video instances is described. In various embodiments, the method may include controlling a device with a display to display a plurality of time code images representing time codes based on a common time base such that, when the time code images are visually captured on video, each frame of the video may be uniquely identified by the display of time code images. The method may also include causing a first captured video instance to include a capture of the device displaying first one or more time code images. The method may also include causing a second captured video instance to include a capture of the device displaying second one or more time code images. The method may also include synchronizing the first and second captured video instances based at least in part on the first and second one or more time code images.

In various embodiments, a computer-implemented method for synchronizing a plurality of captured video instances may be described. The method may include identifying, by a computing device, a first association between frames of a first captured video instance and a common time base based at least in part on a first display of time code images captured in the first captured video instance. The time code images may be configured such that each frame of the captured video instance may be uniquely identified by the display of time code images. The method may also include identifying, by the computing device, a second association between frames of a second captured video instance and the common time base based at least in part on a second display of time code images captured in the second captured video instance. The method may also include synchronizing, by the computing device, the first and second captured video instance based at least in part on the first and second associations.

Computer-readable media (including non-transitory computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A computer-implemented method for facilitating synchronization of captured video, the method comprising:
    displaying, by a computing device, a plurality of time code images respectively representing a plurality of time codes based on a common time base such that, when the time code images are visually captured on video, each time code may be uniquely identified on the video.

2. The computer-implemented method of claim 1, wherein displaying the plurality of time code images further comprises displaying the plurality of time code images such that, when the time code images are visually captured on video, each frame of the video may be uniquely identified by the represented time codes.

3. The computer-implemented method of claim 1, wherein:
    the computing device is coupled to a display; and
    displaying the plurality of time code images comprises displaying the plurality of time code images on the display such that two time code images representing consecutive time codes are displayed in non-overlapping portions of the display.

4. The computer-implemented method of claim 1, wherein displaying the plurality of time code images comprises displaying human-readable time code images.

5. The computer-implemented method of claim 1, wherein displaying the plurality of time code images comprises displaying machine-readable time code images.

6. The computer-implemented method of claim 5, wherein displaying machine-readable time code images comprises displaying two-dimensional bar codes.

7. The computer-implemented method of claim 1, wherein the computing device comprises a portable device including a display and configured to be moved to different physical locations to be captured.

8. The computer-implemented method of claim 1, further comprising:
    receiving, by the computing device, an indication that a user wishes to store a record of a particular time code; and
    storing a record of the time code for later output.

9. The computer-implemented method of claim 8, wherein:
    receiving the indication comprises receiving an activation of a user interface element of an interface of the computing device by the user; and
    storing the record of the time code comprises storing a record of a time code that is contemporaneous with the activation.

10. The computer-implemented method of claim 1, further comprising synchronizing the common time base with another computing device that is also configured to display time code images.

11. The computer-implemented method of claim 1, further comprising determining the common time base based on an internal clock of the computing device.

12. One or more non-transitory computer-readable media containing instructions written thereon that, in response to execution on a computing device, cause the computing device to:
    display a plurality of time code images respectively representing a plurality of time codes based on a common time base;
    wherein the plurality of time code images are displayed such that, when the time code images are visually captured on video, each frame of the video may be uniquely identified by the display of time code images.

13. The one or more non-transitory computer-readable media of claim 12, wherein:
    the computing device is coupled to a physical display; and
    display the plurality of time code images comprises display the plurality of time code images on the physical display such that two time code images representing consecutive time codes are displayed in non-overlapping portions of the physical display.

14. The one or more non-transitory computer-readable media of claim 12, wherein display the plurality of time code images comprises display machine-readable time code images.

15. The one or more non-transitory computer-readable media of claim 14, wherein display machine-readable time code images comprises display two-dimensional bar codes.

16. The one or more non-transitory computer-readable media of claim 12, wherein the computing device comprises a portable device including a display and being is configured to be moved to different physical locations to be captured.

17. An apparatus for facilitating synchronization of captured video, comprising:
    one or more computer processors;
    a display coupled to the one or more computer processors; and
    a time code display module configured to operate the one or more computer processors to:
        display a plurality of time code images on the display, the plurality of time code images respectively representing a plurality of time codes based on a common time base;
    wherein the plurality of time code images are displayed such that, when the time code images are visually captured on video, each frame of the video may be uniquely identified by the display of time code images.

18. The apparatus of claim 17, wherein:
display the plurality of time code images comprises display the plurality of time code images on the display such that two time code images representing consecutive time codes are displayed in non-overlapping portions of the physical display.

19. The apparatus of claim 17, wherein display the plurality of time code images comprises display machine-readable time code images.

20. The apparatus of claim 19, wherein display machine-readable time code images comprises display two-dimensional bar codes.

21. The apparatus of claim 17, wherein the apparatus comprises a portable device including a display and being configured to be moved to different physical locations to be captured.

22. A method for facilitating the synchronization of a plurality of captured video instances, the method comprising:
controlling a device with a display to display a plurality of time code images representing time codes based on a common time base such that, when the time code images are visually captured on video, each frame of the video may be uniquely identified by the display of time code images;
causing a first captured video instance to include a capture of the device displaying first one or more time code images;
causing a second captured video instance to include a capture of the device displaying second one or more time code images; and
synchronizing the first and second captured video instances based at least in part on the first and second one or more time code images.

23. A computer-implemented method for synchronizing a plurality of captured video instances, the method comprising:
identifying, by a computing device, a first association between frames of a first captured video instance and a common time base based at least in part on a first display of time code images captured in the first captured video instance and configured such that each frame of the captured video instance may be uniquely identified by the display of time code images;
identifying, by the computing device, a second association between frames of a second captured video instance and the common time base based at least in part on a second display of time code images captured in the second captured video instance; and
synchronizing, by the computing device, the first and second captured video instance based at least in part on the first and second associations.

* * * * *